(12) United States Patent
Bhardwaj et al.

(10) Patent No.: US 11,466,733 B2
(45) Date of Patent: Oct. 11, 2022

(54) COUPLING FOR POWER GENERATION SYSTEM

(71) Applicant: Cummins Generator Technologies Limited, Peterborough (GB)

(72) Inventors: Rahul Bhardwaj, Columbus, IN (US); Dumitru Razvan Stanca, Craiova (RO); Daniel Ciochina, Craiova (RO); Radu Caplescu, Craiova (RO); Popescu Ionut, Craiova (RO)

(73) Assignee: Cummins Generator Technologies Limited, Peterborough (GB)

( * ) Notice: Subject to any disclaimer, the term of this patent is extended or adjusted under 35 U.S.C. 154(b) by 309 days.

(21) Appl. No.: 16/541,956

(22) Filed: Aug. 15, 2019

(65) Prior Publication Data

US 2019/0368550 A1 Dec. 5, 2019

Related U.S. Application Data (63) Continuation of application No. 15/210,180, filed on Jul. 14, 2016, now Pat. No. 10,428,877.

(30) Foreign Application Priority Data

Jul. 15, 2015 (EP) .................................... 15176912

(51) Int. Cl.
| | | |
|---|---|---|
| *F16D 3/84* | (2006.01) | |
| *F16D 3/54* | (2006.01) | |
| *F16D 3/76* | (2006.01) | |
| *H02K 7/00* | (2006.01) | |
| *F02B 63/04* | (2006.01) | |
| *F02B 67/04* | (2006.01) | |

(52) U.S. Cl.
CPC .............. *F16D 3/843* (2013.01); *F16D 3/54* (2013.01); *F16D 3/76* (2013.01); *H02K 7/003* (2013.01); *F02B 63/04* (2013.01); *F02B 67/04* (2013.01); *Y10T 29/4973* (2015.01)

(58) Field of Classification Search
CPC .. F16D 3/843; F16D 3/54; F16D 3/76; H02K 7/003; Y10T 29/4973; F02B 63/04; F02B 67/04
USPC ..................................... 464/89–91, 176, 177
See application file for complete search history.

(56) References Cited

U.S. PATENT DOCUMENTS

| | | | |
|---|---|---|---|
| 732,400 A | 6/1903 | Dresser et al. | |
| 1,733,771 A * | 10/1929 | Baker | ....................... F16D 3/76 |
| | | | 464/91 |
| 1,775,556 A | 9/1930 | Hewel | |
| 2,640,334 A * | 6/1953 | Spang | .................... A22C 9/008 |
| | | | 464/177 |
| 2,716,873 A * | 9/1955 | Byers | ....................... F16D 7/02 |
| | | | 464/89 |

(Continued)

OTHER PUBLICATIONS

Universal Joint and Driveshaft Design Manual, AE-7, Society of Automotive Engineers, Inc., Warrendale, PA, 93-95 TJ1079.S62 (Year: 1979).

*Primary Examiner* — Greg Binda
(74) *Attorney, Agent, or Firm* — Foley & Lardner LLP (57) ABSTRACT

A coupling is disclosed for connecting rotating components of a generator and a prime mover in a power generation system. The coupling comprises a hub, a coupling flange and an elastomeric component located between the hub and the coupling flange. The elastomeric component is removable radially from the coupling.

14 Claims, 12 Drawing Sheets

(56) References Cited

U.S. PATENT DOCUMENTS

| | | | | |
|---|---|---|---|---|
| 3,296,828 A | * | 1/1967 | Stubner | F16D 3/76 |
| | | | | 464/89 |
| 3,626,767 A | * | 12/1971 | Wildi | F16D 3/50 |
| | | | | 464/176 |
| 5,252,028 A | * | 10/1993 | LoBosco | B63H 1/20 |
| | | | | 464/89 |
| 6,190,261 B1 | | 2/2001 | Powell | |
| 6,241,618 B1 | | 6/2001 | Doll | |
| 6,581,267 B1 | * | 6/2003 | Olbrich | F16F 15/1442 |
| | | | | 464/89 |
| 2018/0145559 A1 | | 5/2018 | Johnson et al. | |

\* cited by examiner

COUPLING FOR POWER GENERATION SYSTEM

CROSS-REFERENCE TO RELATED APPLICATION

This application is a continuation of U.S. patent application Ser. No. 15/210,180, filed Jul. 14, 2016, now U.S. Pat. No. 10,428,877, issued on Oct. 1, 2019, which claims the benefit of and priority to European Patent Application No. 15176912.2, filed Jul. 15, 2015, and the contents of both are incorporated herein by reference in their entirety.

BACKGROUND

The present disclosure relates to an adaptor for connecting a generator to a prime mover in a power generation system, and in particular an adaptor which can facilitate servicing of parts of the system.

Power generation systems typically comprise a prime mover which drives an electrical generator in order to produce output electrical power. For example, a power generating set may comprise an engine coupled to a generator (alternator). Typically the crankshaft of the engine is mechanically coupled to the shaft of the generator using a coupling.

In a power generation system it is necessary for the prime mover and the generator to be precisely aligned, to ensure concentricity of the rotating parts. In a generating set this is usually achieved by mounting the engine and the generator on a bed frame. In addition, an adaptor may be used to connect non-rotating parts of the generator and the engine. The adaptor provides additional stability and helps to prevent relative movement between the engine and the generator.

During the lifetime of the power generation system it may become necessary to service some of the moving parts. For example, in certain generating sets, it may become necessary to service parts such as the coupling between the engine and the generator, and/or the engine or generator bearings.

Existing power generating systems typically require the generator to be moved to provide access for servicing moving parts. In order to move the generator it must first be disconnected. Following servicing, the generator must be reconnected and the engine and generator re-aligned. As a consequence, the servicing of moving parts can be time consuming, complex and costly. For example, the servicing repair time for the coupling on a typical gas generator set installation may be around 14 to 15 hours.

Existing adaptors are usually cylindrical, and surround the generator shaft and/or the coupling. Such adaptors are typically formed from a single cast piece of metal. Openings or windows may be provided in the adaptor to allow an operator to connect the rotating parts. However these openings do not normally allow servicing of moving parts.

SUMMARY

According to a first aspect of the present disclosure there is provided a coupling for connecting rotating components of a generator and a prime mover in a power generation system, the coupling including a hub, a coupling flange and an elastomeric component located between the hub and the coupling flange. The elastomeric component is removable radially from the coupling.

In some embodiments, a power generation system comprising a prime mover, a generator and a coupling connecting rotating components of the prime mover and the generator, the coupling including a hub connected to a generator shaft, a coupling flange connected to a rotating component of the prime mover, and an elastomeric component located between the hub and the coupling flange. The elastomeric component is removable radially from the power generation system.

In some embodiments, a method of servicing a power generation system includes a prime mover and a generator. The rotating components of the generator and the prime mover are connected with a coupling that includes a hub, a coupling flange and an elastomeric component. The method further includes removing the elastomeric component radially from the coupling.

In the present specification terms such as "radial", "axial", "circumferential" etc. are generally defined with reference to the axis of a generator and/or engine to which the adaptor is to be connected, and/or the longitudinal axis of the adaptor.

Features of one aspect of the present disclosure may be provided with any other aspect. Apparatus features may be provided with method aspects and vice versa.

Features of the present disclosure will now be described, purely by way of example, with reference to the accompanying drawings.

DETAILED DESCRIPTION

Overview

Figure 1:
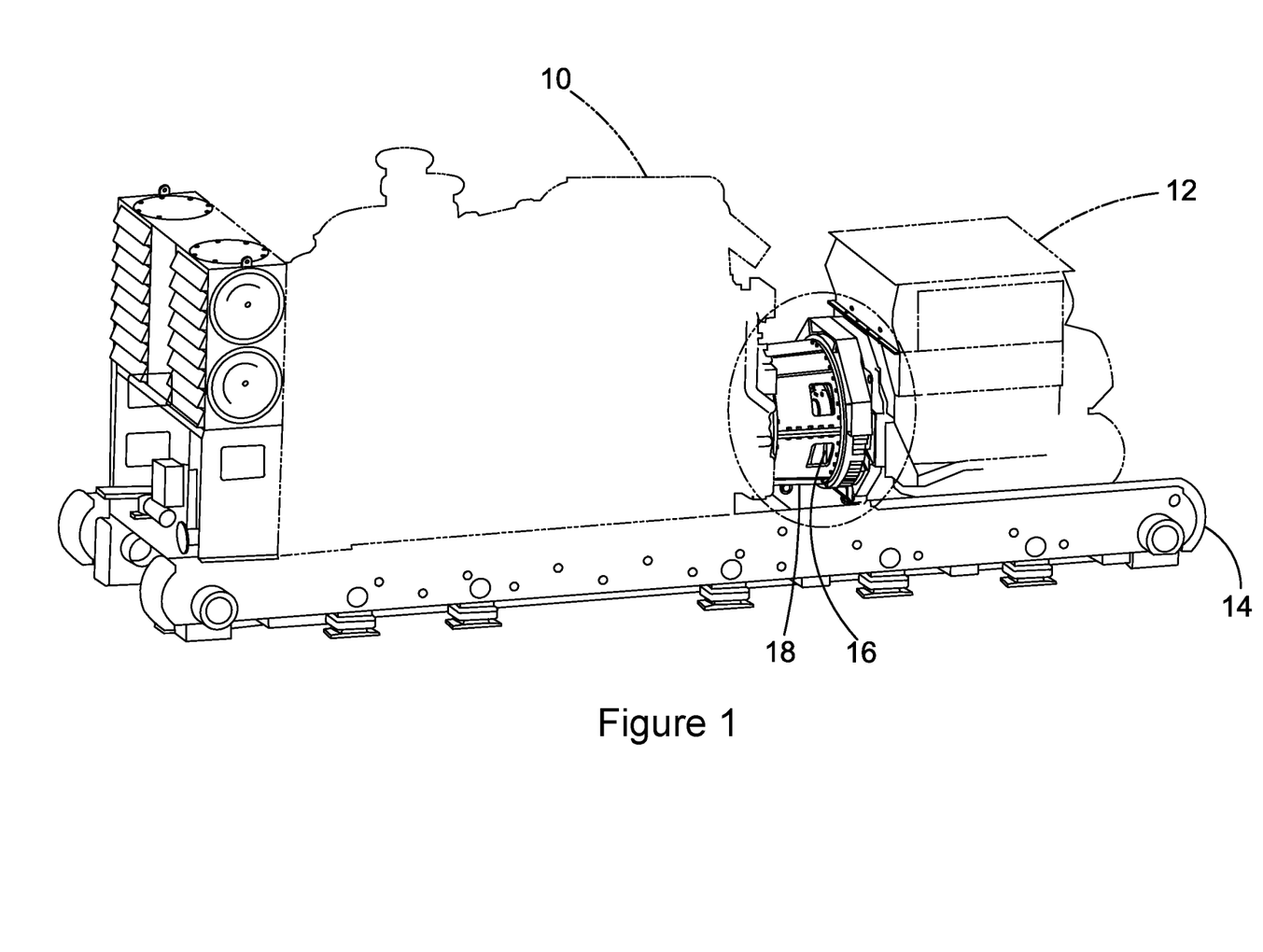
FIG. 1 shows an overview of a generating set, according to an example embodiment.

FIG. 1 shows an overview of a generating set in an embodiment of the present invention. Referring to FIG. 1, the generating set comprises an engine 10 coupled to a generator (alternator) 12. In this embodiment the engine 10 is a gas engine, although any type of internal combustion engine such as a petrol or diesel engine may be used instead. In this embodiment the generator 12 is a synchronous generator, although any other type of electrical generator may be used instead. The engine 10 and generator 12 are both mounted on a bed frame 14. A coupling 16 is used to connect the engine flywheel to the shaft of the generator. An adaptor 18 surrounds the coupling, and is used to connect the engine to the generator housing. The adaptor 18 helps to prevent relative movement between the engine and the generator, thus ensuring greater stability during operation of the generating set.

In the embodiment of FIG. 1, the coupling 16 is a flexible coupling. Flexible couplings are typically used in high power generating sets. For example, high horse power continuous purpose gas generating sets may require a flexible coupling, in particular where a variety of gases such as low BTU natural gas to pipeline gas are used. The flexible coupling can dampen vibratory torque in the system and acts as fuse in the drive line.

Flexible couplings typically include an elastomeric material. The elastomeric material may degrade over time, particularly when subject to high stresses. As a consequence, the life time of a flexible coupling varies depending on its application. In some cases the flexible coupling may fail before the end of its target life. In this case servicing of the coupling may be required outside of a scheduled overhaul of the generator set.

In existing generator set designs, the adaptor is formed from a single piece of cast metal. Windows may be provided in the adaptor, to allow an operator to connect the coupling once the generator and engine have been aligned. However this does not allow replacement or servicing of the coupling.

In order to service the coupling in existing generator set designs, the generator set is first shut down. All harnesses and other connections are disconnected, and the generator with adaptor is pulled back from the engine. Following replacement or servicing of the coupling, it is necessary for all parts to be reconnected, and the generator to be re-aligned with the engine.

As a consequence, replacement or servicing of the coupling is a complex and time consuming process, typically taking 14 to 15 hours depending on the installation. This results in high shutdown costs, both in terms of the servicing required and the lost generating capacity.

Adaptor Design

Embodiments of the present invention relate to a new adaptor design and a new flexible coupling which can facilitate servicing without requiring the generator to be moved.

Figure 2:
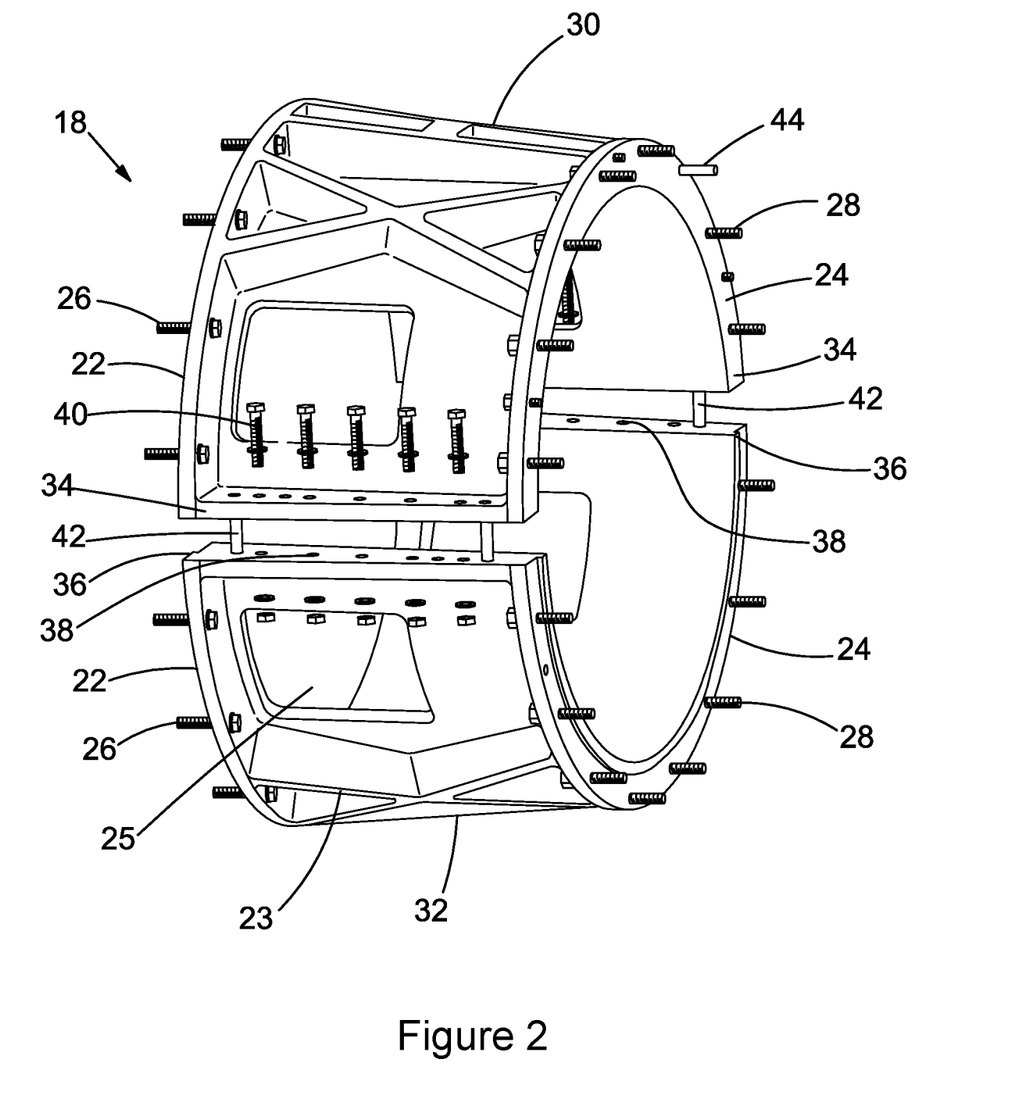
FIG. 2 shows an adaptor, according to an example embodiment.

FIG. 2 shows an adaptor 18 in an embodiment of the present invention. Referring to FIG. 2, the adaptor 18 is generally cylindrical, and comprises a first flange 22 for connection to the generator and a second flange 24 for connection to the engine. The first flange and second flange each comprise a number of bolt holes. Bolts 26 pass through the bolt holes in the first flange in order to connect the adaptor to the generator, while bolts 28 pass through the bolt holes in the second flange in order to connect the adaptor to the engine. In this embodiment cross braces 23 are provided on the outside surface of the adaptor, to help provide structural rigidity. Windows 25 are provided in the adaptor, to allow an operator to lock the coupling on generator shaft once the engine, generator and adaptor are in place.

In the arrangement of FIG. 2, the adaptor 18 is divided into a top part 30 and a bottom part 32. In this embodiment the division occurs in a plane within which the axis of symmetry of the adaptor lies. Thus, in this embodiment the two halves are semi-cylindrical. However the division may occur in different places and the two parts are not necessarily equal.

Still referring to FIG. 2, flanges 34, 36 are provided at the interfaces between the top part and the bottom part. Each of the flanges has a number of bolt holes 38. Bolts 40 pass through the bolt holes to connect the two parts together. Two additional centering pins 42 are provided on each side of the adaptor. The centering pins 42 help to ensure alignment between the two parts of the adaptor. In addition, centering pins 44 are provided in the second flange 24 in the top part 30. The centering pins 44 help to ensure alignment of the top part 30 with the engine, in particular following removal of the top part in the way described below.

The adaptor 18 of FIG. 2 may be made from a cast metal, such as spheroidal graphite cast iron. The adaptor may be machined following casting to provide the appropriate interface surfaces and/or bolt holes.

Figure 3:
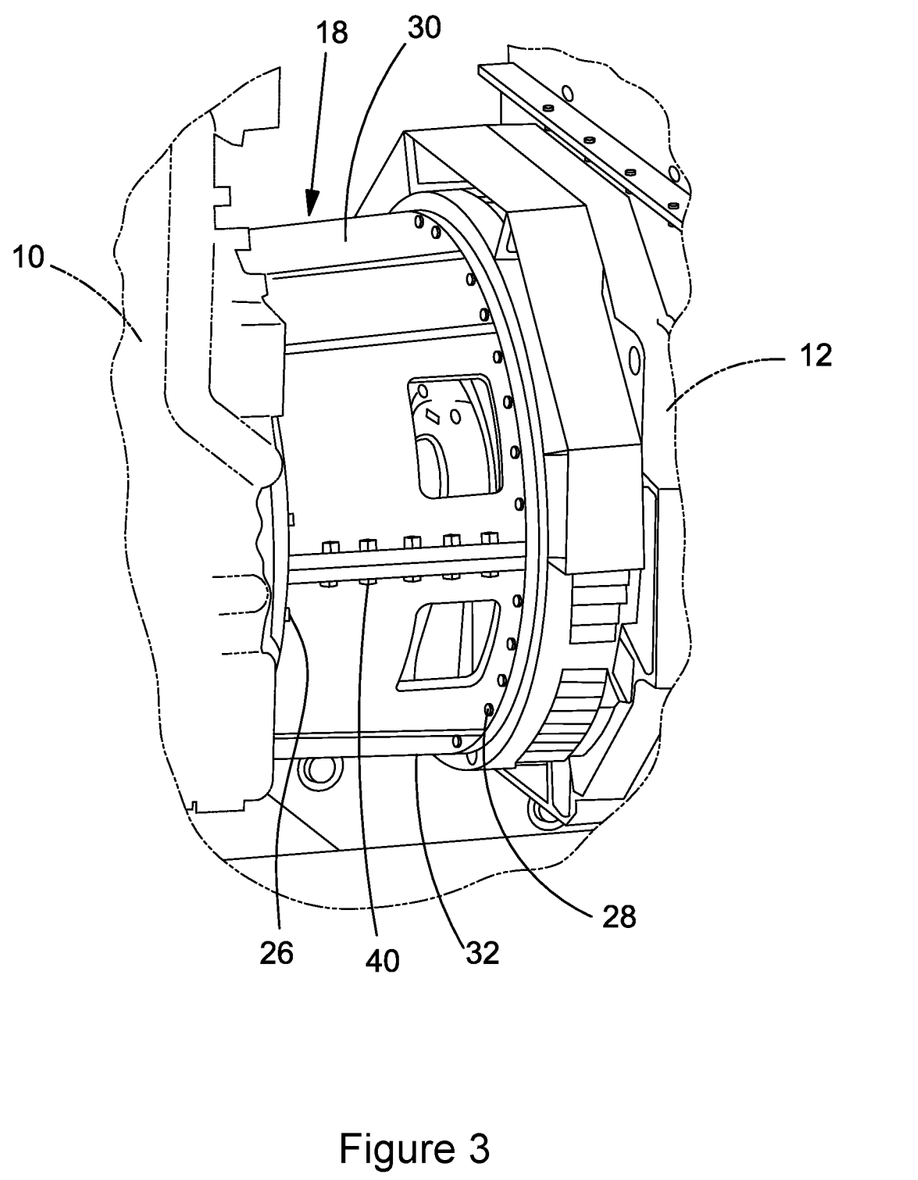
FIG. 3 shows part of the generating set with the adaptor in place, according to an example embodiment.

FIG. 3 shows part of the generating set with the adaptor 18 in place. Referring to FIG. 3, the two parts 30, 32 of the adaptor 18 are held together by bolts 40. The adaptor is bolted to the engine 10 with bolts 26, and to the generator 12 with bolts 28.

Flexible Coupling

Figure 4A:
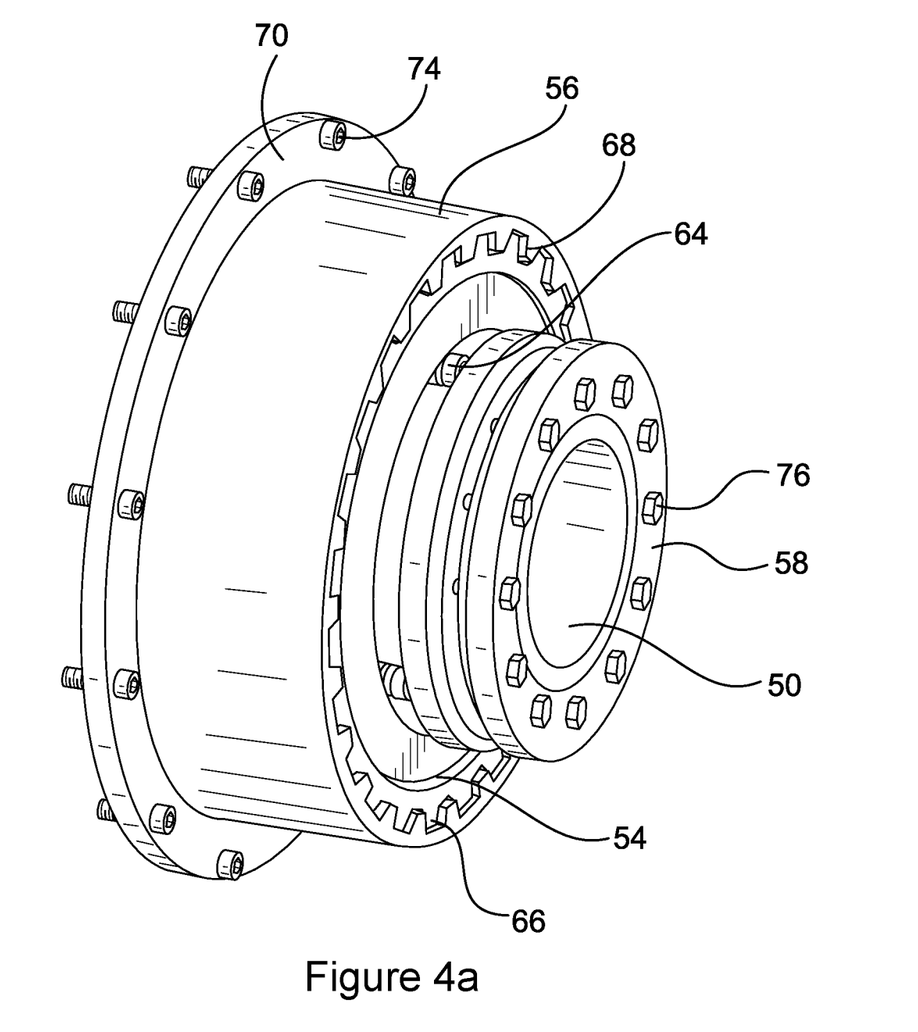
FIG. 4a is a perspective view of a coupling, according to an example embodiment.
Figure 4B:
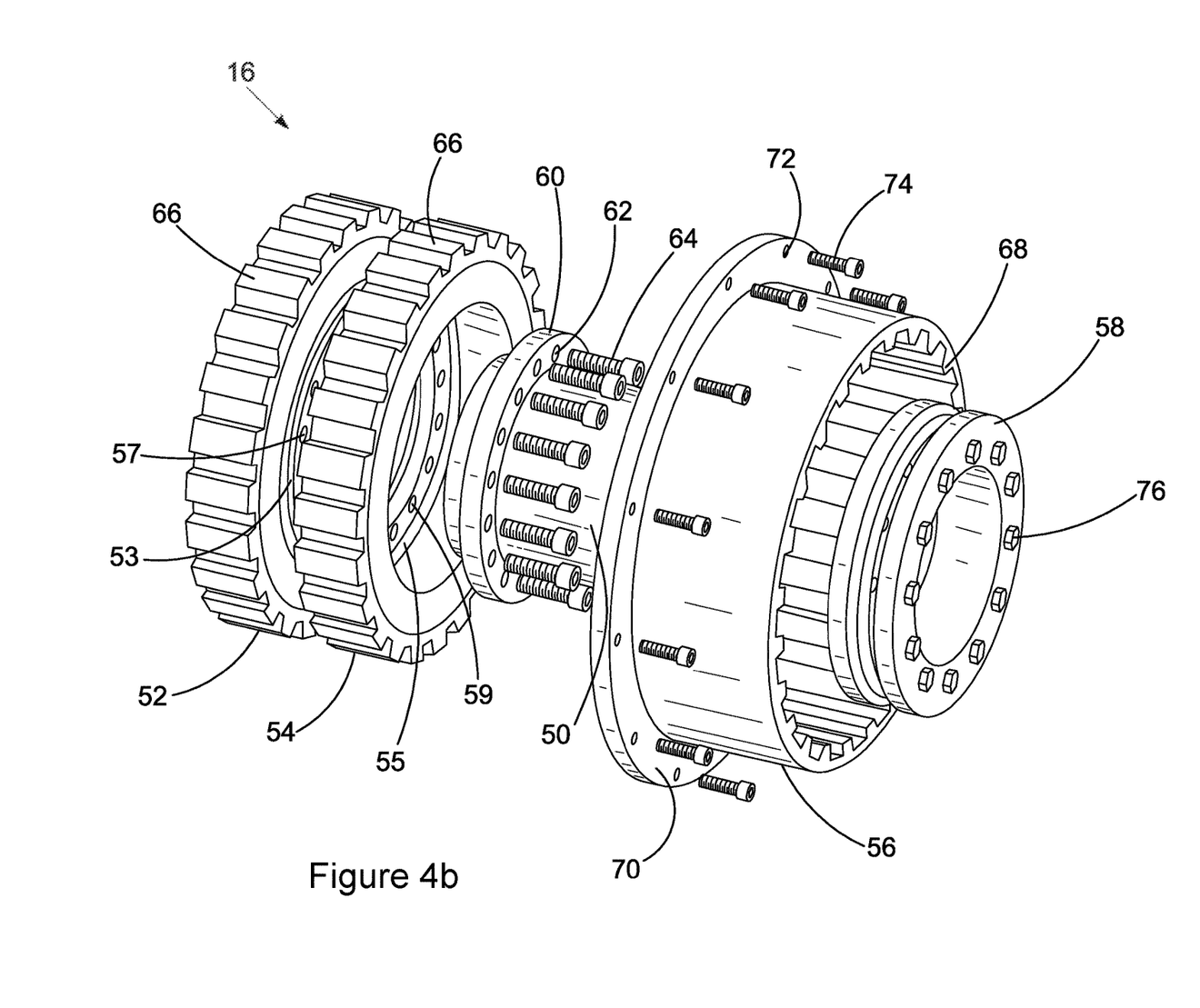
FIG. 4b is an exploded view of the coupling of FIG. 4a, according to an example embodiment.
Figure 4C:
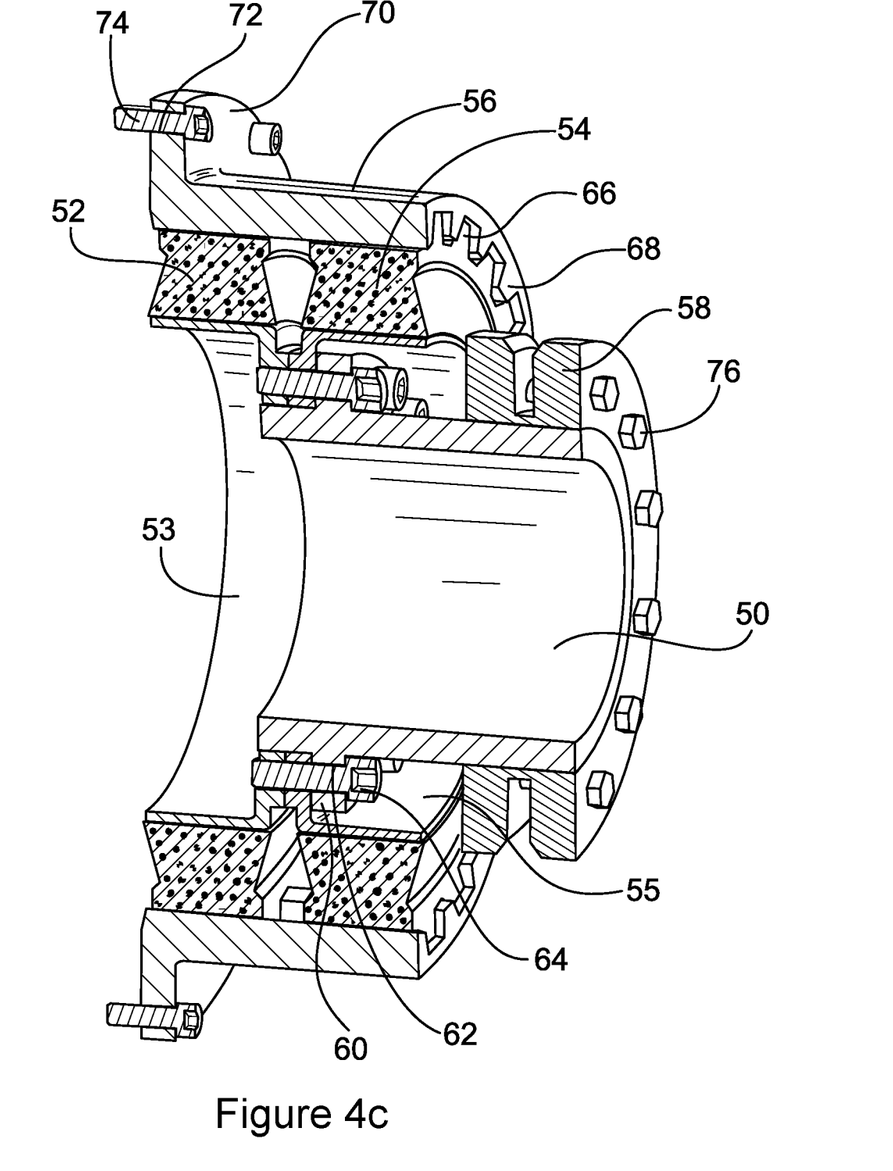
FIG. 4c is a section view of the coupling of FIG. 4a, according to an example embodiment.

FIGS. 4a-c show a perspective view, an exploded view, and a section view of a coupling for use in an embodiment of the present invention. Referring to FIG. 4a-c, the coupling comprises a hub 50, two elastomeric components 52, 54, a coupling flange 56, and a locking assembly 58. The hub 50 is arranged to be connected to the generator shaft, while the coupling flange 56 is arranged to be connected to the engine fly wheel.

In the arrangement of FIGS. 4a-c, each of the elastomeric components 52, 54 is disc-shaped. The elastomeric components may be made from any suitable material having the required degree of flexibility, such as rubber. A sleeve 53, 55 is provided on the inside of each of the elastomeric components 52, 54. The sleeves are made from a rigid material such as a metal or a high density plastic. Each of the sleeves 53, 55 includes bolt holes 57, 59 for connecting the elastomeric components 52, 54 to the hub 50.

The hub 50 includes a hub flange 60 with bolt holes 62. Hub bolts 64 pass through the bolt holes 62 and the bolt holes 57, 59 in the sleeves 53, 55, in order to bolt the hub 50 to the elastomeric components 52, 54. When connected, part of the hub 50 passes through the inside of the second elastomeric component 54, while the end of the hub 50 engages with the sleeve 53 in the first elastomeric component 52.

The outside circumferences of the elastomeric components include castellations 66. The coupling flange 56 is generally cylindrical, and fits around the elastomeric components 52, 54. The inside surface of the coupling flange includes castellations 68, which engage with the castellations 66 on the outside of the elastomeric components 52, 54.

The coupling flange 56 includes a flange 70 with bolt holes 72. Flange bolts 74 are used to bolt the coupling flange to the engine fly wheel through the bolt holes 72. The external locking assembly 58 comprises bolts 76 which are used to hold the coupling together.

The coupling shown in FIGS. 4a-c provides a torsionally soft connection between the engine and the generator. A flexible torque transmission characteristic is achieved by means of the elastomeric components 52, 54 between the hub 50 and the coupling flange 56. This can allow the absorption of torsional vibrations and may help to compensate for misalignments.

Servicing

In use the elastomeric components 52, 54 shown in FIG. 4 may degrade and require replacement. FIGS. 5 to 13 illustrate a process for replacement of the elastomeric components 52, 54 without requiring removal of the generator 12.

Figure 5:
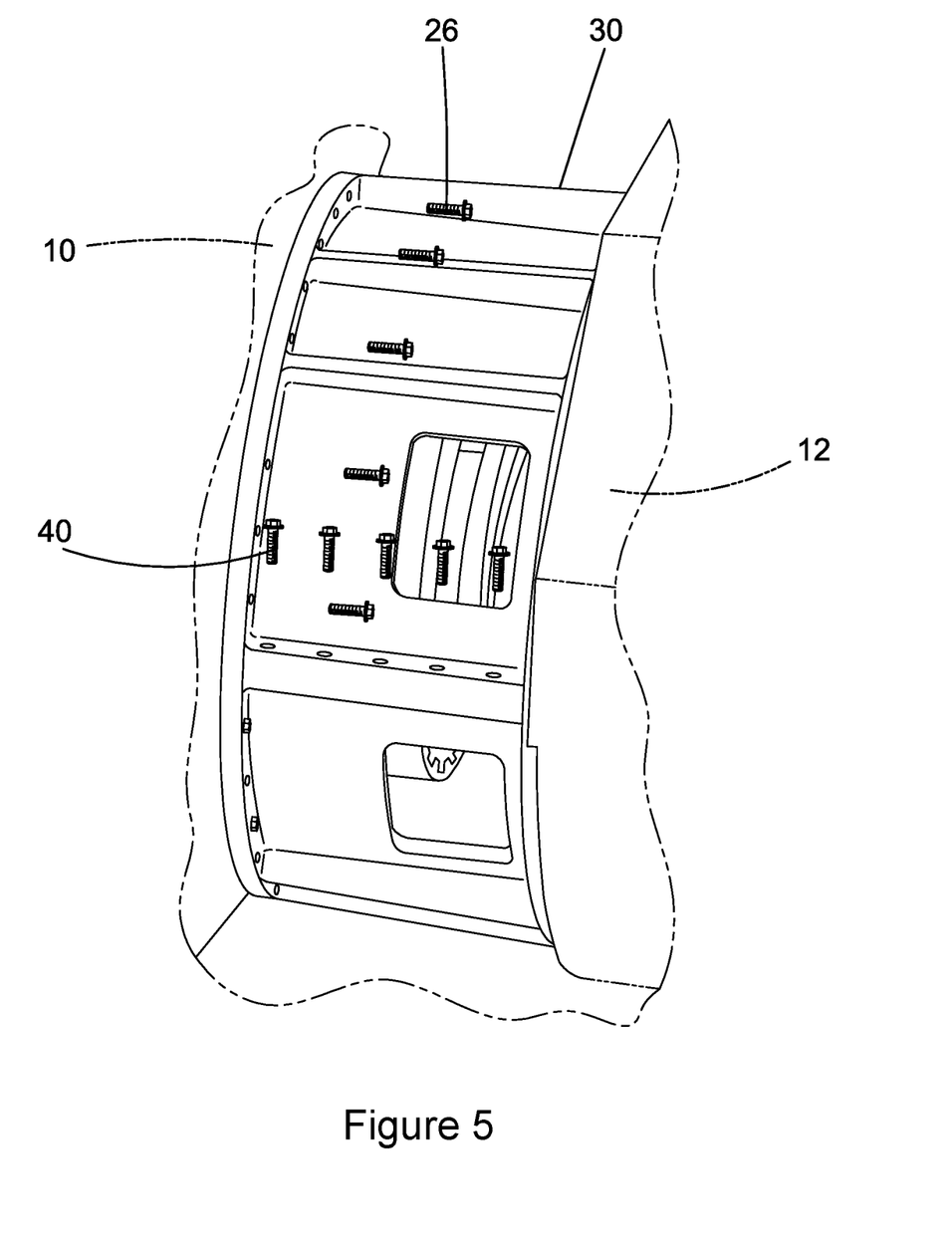
FIGS. 5 to 13 illustrate a process for replacement of elastomeric components in the coupling, according to an example embodiment.

Referring to FIG. 5, in step 1 the adaptor bolts 26 connecting the top part of the adaptor 30 to the engine 10, and the adaptor bolts 28 connecting the top part of the adaptor 30 to the generator 12, are undone. In addition, the bolts 40 connecting the two parts of the adaptor together are undone.

Figure 6:
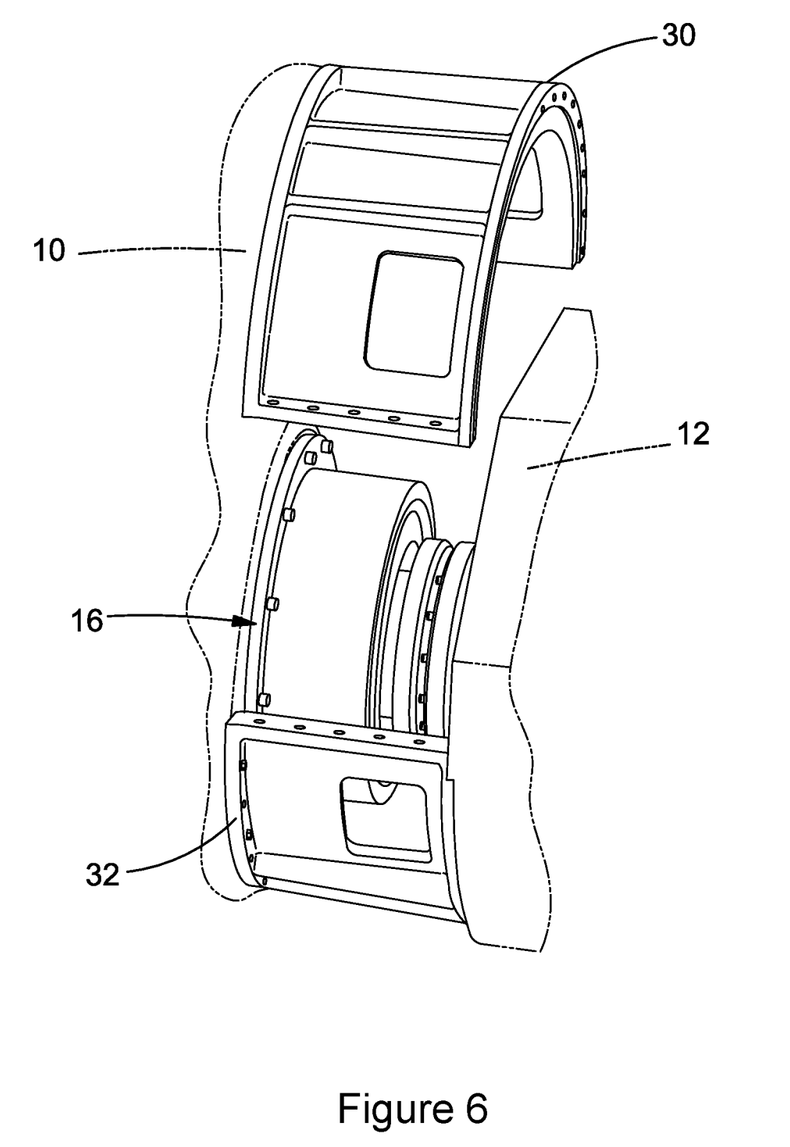

Referring to FIG. 6, in step 2 the top part 30 of the adaptor is removed from the generator set in a radial direction. Removal of the top part of the adaptor exposes the coupling 16.

Figure 7:
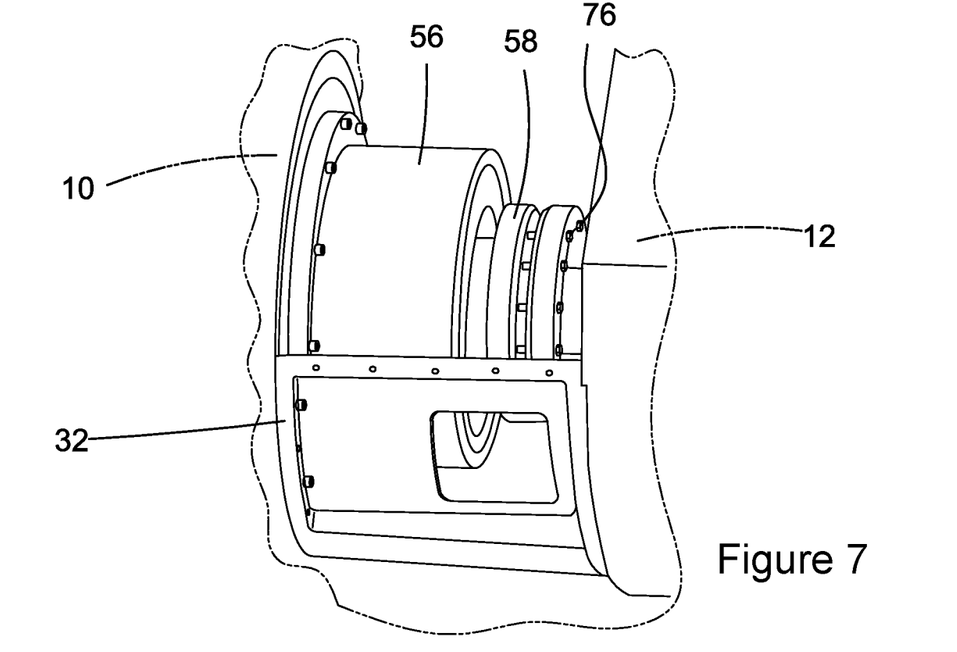

Referring to FIG. 7, in step 3 the bolts 76 of the external locking assembly 58 are undone. The locking assembly 58 is then slid axially along the shaft towards the generator 12. This exposes the hub bolts 64.

Figure 8:
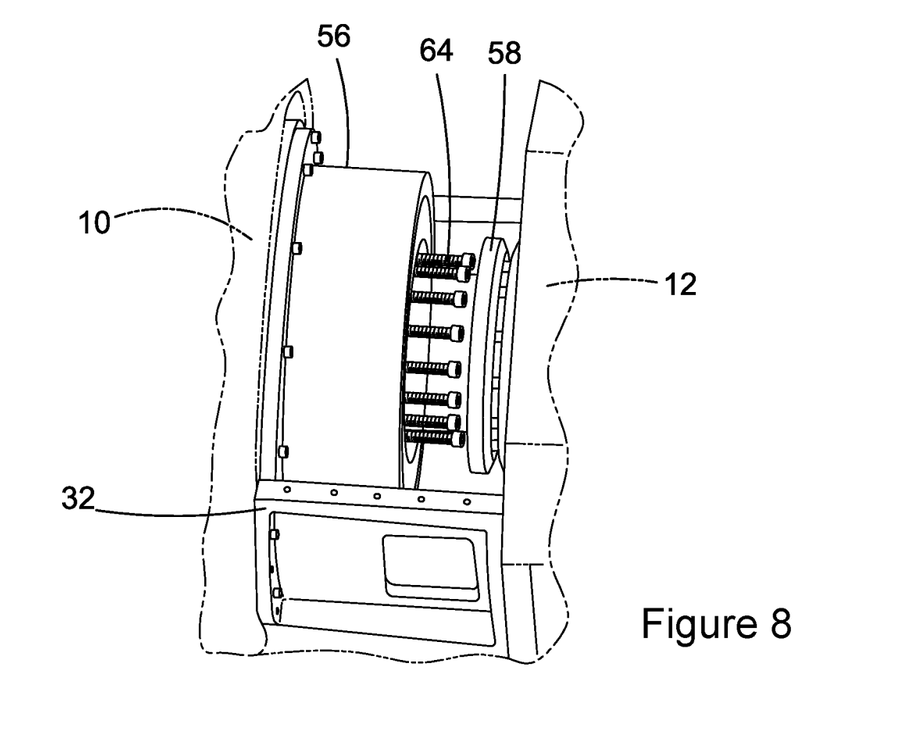

Referring to FIG. 8, in step 4 the hub bolts 64 are undone and removed. This disconnects the elastomeric components 52, 54 from the hub 50.

Figure 9:
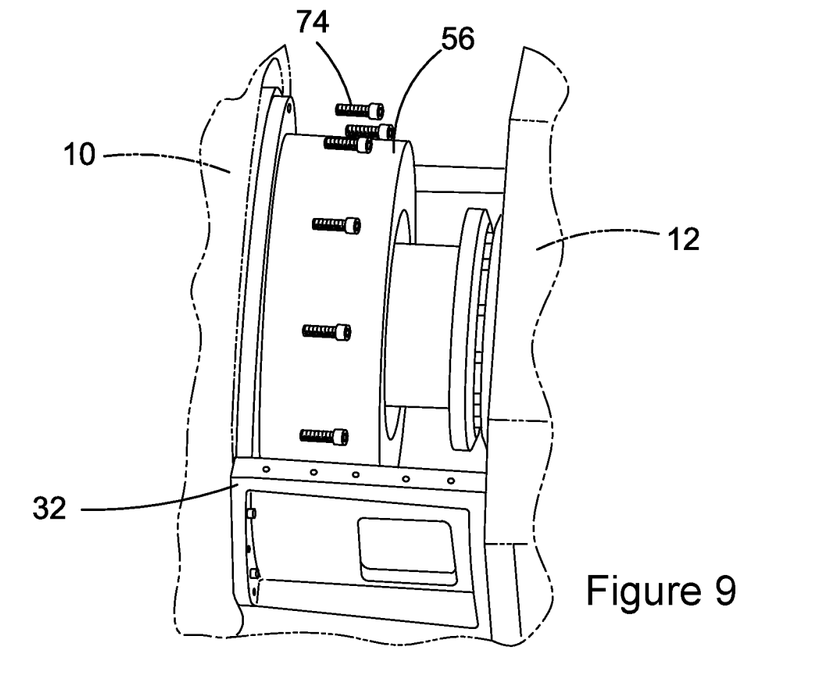

Referring to FIG. 9, in step 5 the coupling flange bolts 74 are undone and removed. This disconnects the coupling flange 56 from the engine 10.

Figure 10:
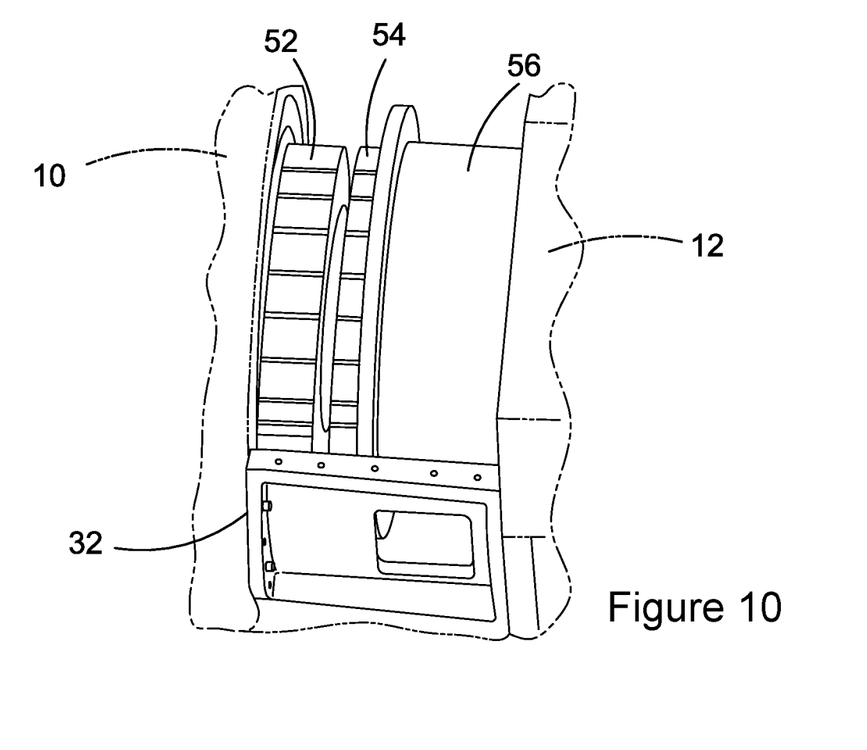

Referring to FIG. 10, in step 6 the coupling flange 56 is slid axially along the shaft towards the generator 12. This reveals the first elastomeric component 52 and part of the second elastomeric component 54. In this position the coupling flange 56 is held in place, for example, with a lifting device (not shown).

Figure 11:
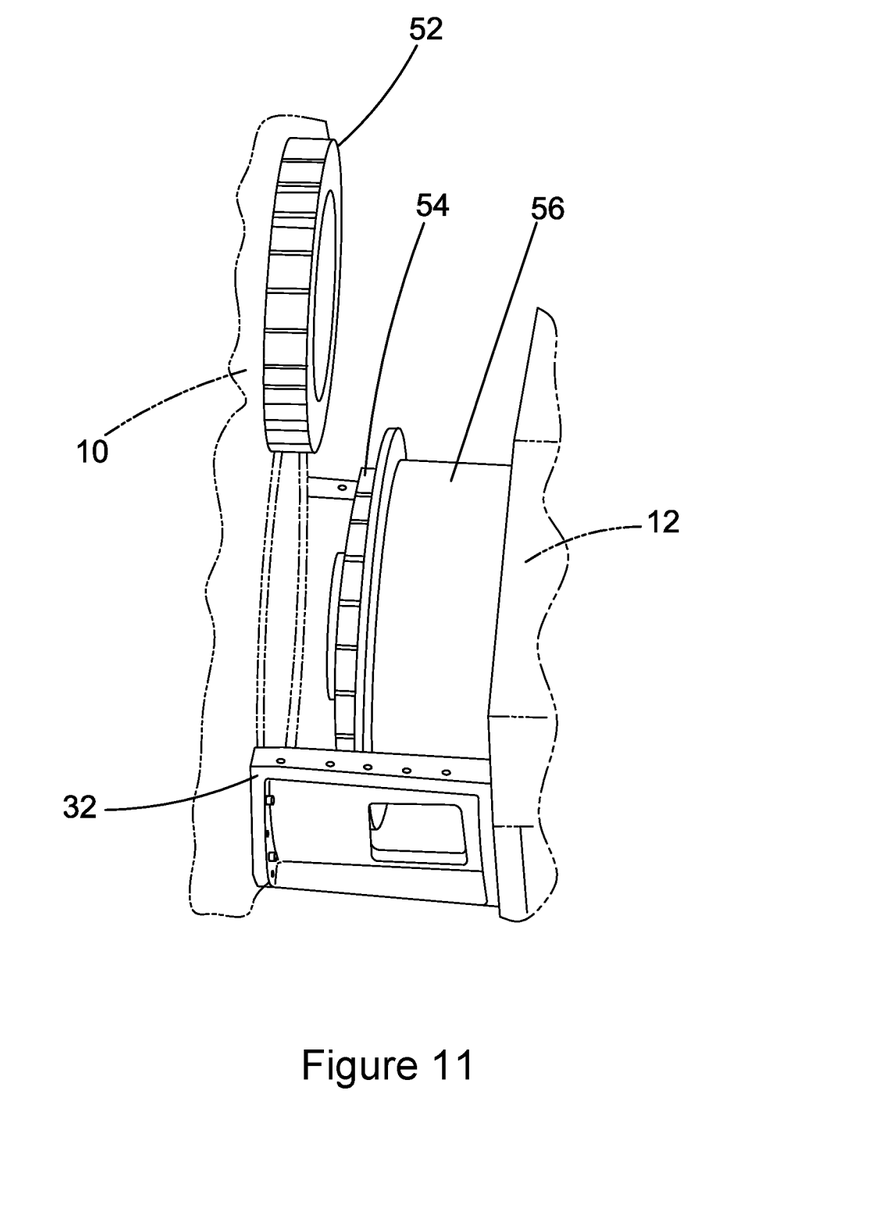

Referring to FIG. 11, in step 7 the first elastomeric component 52 is then removed in a radial direction. Removal of the elastomeric component 52 is possible due to the fact that the hub bolts 64 have been removed and the coupling flange 56 has been pulled back.

Figure 12:
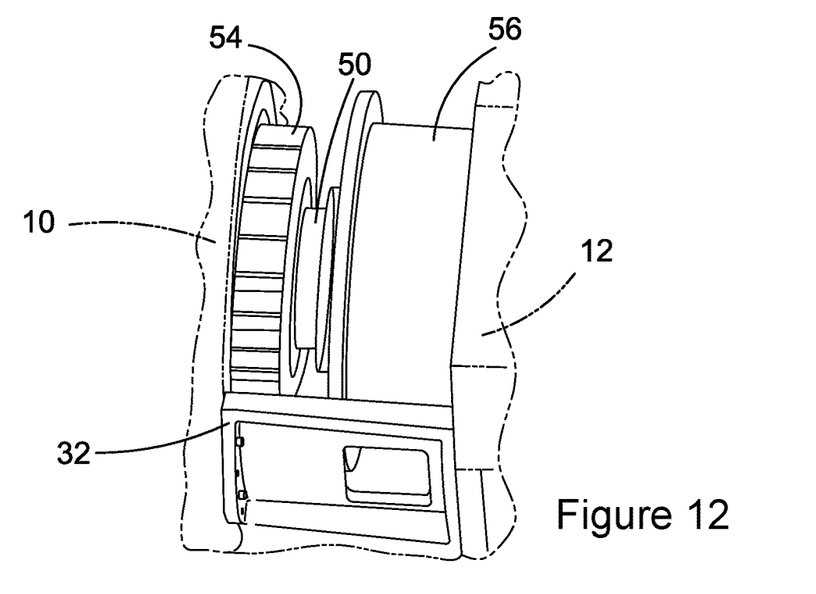

Referring to FIG. 12, in step 8 the second elastomeric component 54 is then slid axially along the hub 50 in the direction of the engine 10. This releases the elastomeric component 54 from the hub.

Figure 13:
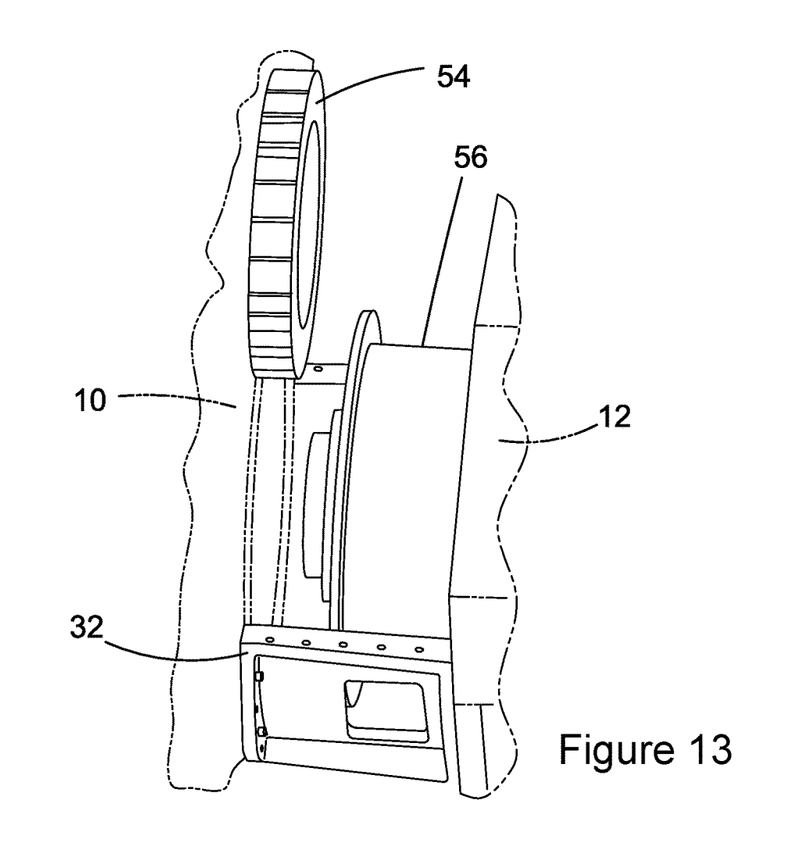

Referring to FIG. 13, in step 9 the second elastomeric component 54 is then removed in a radial direction.

The elastomeric components 52, 54 can then be replaced. Steps 1 to 9 are then repeated in reverse, in order to reassemble the coupling with the new elastomeric components.

Some of the advantages which may be provided by the techniques described above are as follows:
- No need to move the generator back when servicing the coupling
- Fewer steps for disassembly/assembly
- Servicing time reduced by 80% compared to previous techniques
- Less facility space required
- No need to disassemble other subsystems of the generator set, such as wires from the generator
- Lower cost of ownership to the end user.

In the above, embodiments of the invention have been described by way of example only, and variations in the design are possible. For example, the division between the two parts of the adaptor may be in different places and the two parts are not necessarily equal. It is not necessary for the adaptor to be divided along the whole of its length, and the removable part may extend along only part of the length of the adaptor. If desired, castellations may be provided on the interfaces between the two parts of the adaptor. Furthermore, if desired, the adaptor may comprise three or more parts, the only requirement being that at least one part of the adaptor is separable from the or each other part. Many other variations in detail will be apparent to the skilled person within the scope of the appended claims.

Although embodiments of the invention have been described with reference to a generator set, the present invention may be used with any type of power generation system where an adaptor is used to connect a prime mover to a generator.

The invention claimed is:

1. A power generation system comprising:
   a prime mover;
   a generator with a generator shaft; and
   a coupling which connects rotating components of the generator and the prime mover, wherein the coupling comprises:
      a hub connected to the generator shaft;
      a coupling flange connected to a rotating component of the prime mover; and
      an elastomeric component located between the hub and the coupling flange in order to provide flexible torque transmission between the prime mover and the generator,
   wherein the coupling flange is arranged to be disconnected from the prime mover and to move axially along the generator shaft towards the generator in order to disengage the coupling flange from the elastomeric component, and
   wherein the elastomeric component is arranged to be removed radially from the coupling when the coupling flange has been moved axially along the generator shaft towards the generator.

2. A power generation system according to claim 1, wherein the elastomeric component is located inside the coupling flange during operation of the power generation system.

3. A power generation system according to claim 1, wherein the elastomeric component comprises castellations which engage with castellations on the coupling flange.

4. A power generation system according to claim 1, wherein the elastomeric component is removably connected to the hub.

5. A power generation system according to claim 1, wherein the elastomeric component is disc-shaped.

6. A power generation system according to claim 1, comprising two elastomeric components.

7. A power generation system according to claim 6, wherein both of the elastomeric components are located between the hub and the coupling flange.

8. A power generation system according to claim 6, wherein removal of one of the elastomeric components allows the other elastomeric component to be slid axially along the hub and then removed in a radial direction.

9. A power generation system according to claim 1, wherein the prime mover is an engine, and the coupling flange is connected to an engine flywheel.

10. A power generation system according to claim 1, further comprising a bed frame, wherein the prime mover and the generator are mounted on the bed frame.

11. A power generation system according to claim 1, wherein the elastomeric component is removable without requiring removal of the generator from the prime mover.

12. A power generation system according to claim 1, further comprising an adaptor connecting non-rotating parts of the generator and the prime mover, wherein:
   the adaptor is arranged to surround the coupling;
   the adaptor comprises two separable parts;
   one part of the adaptor is removable to leave an opening while the other part of the adaptor remains in place; and
   the elastomeric component is removable through the opening.

13. A method of servicing a power generation system comprising a prime mover;
   a generator with a generator shaft; and
   a coupling, wherein rotating components of the generator and the prime mover are connected with the coupling, the coupling comprising:

a hub connected to the generator shaft,
a coupling flange connected to a rotating component of the prime mover, and
an elastomeric component located between the hub and the coupling flange and which provides flexible torque transmission between the prime mover and the generator, the method comprising:

disconnecting the coupling flange from the prime mover;

moving the coupling flange axially along the generator shaft towards the generator in order to disengage the coupling flange from the elastomeric component; and removing the elastomeric component radially from the coupling when the coupling flange has been moved axially along the generator shaft towards the generator.

14. A method according to claim 13, the power generation system further comprising:

an adaptor connecting non-rotating parts of the generator and the prime mover, wherein the adaptor surrounds the coupling and the adaptor comprises:
two separable parts, the method further comprising:

removing one part of the adaptor to leave an opening while the other part of the adaptor remains in place, and removing the elastomeric component through the opening.

* * * * *